(12) United States Patent
Massou et al.

(10) Patent No.: US 12,731,506 B2
(45) Date of Patent: Sep. 8, 2026

(54) SYSTEM FOR LEARNING BRAILLE AND METHOD FOR IMPLEMENTING SUCH A SYSTEM

(71) Applicant: UNIVERSITE DE LORRAINE, Nancy (FR)

(72) Inventors: Jean Massou, Moulins les Metz (FR); Didier Foret, Ay sur Moselle (FR); Benjamin Accorsi, Marly (FR); Mattéo Costa, Dol de Bretagne (FR)

(73) Assignee: UNIVERSITE DE LORRAINE, Nancy (FR)

( * ) Notice: Subject to any disclaimer, the term of this patent is extended or adjusted under 35 U.S.C. 154(b) by 0 days.

(21) Appl. No.: 18/720,309

(22) PCT Filed: Dec. 9, 2022

(86) PCT No.: PCT/EP2022/085129

§ 371 (c)(1),
(2) Date: Dec. 3, 2024

(87) PCT Pub. No.: WO2023/110662

PCT Pub. Date: Jun. 22, 2023

(65) Prior Publication Data

US 2025/0104574 A1 Mar. 27, 2025

(30) Foreign Application Priority Data

Dec. 17, 2021 (FR) ...................................... 2113879

(51) Int. Cl.
*G09B 21/00* (2006.01)
*G06F 3/16* (2006.01)

(52) U.S. Cl.
CPC ......... *G09B 21/003* (2013.01); *G09B 21/006* (2013.01); *G06F 3/165* (2013.01)

(58) Field of Classification Search
CPC .... G09B 21/00; G09B 21/003; G09B 21/006; G06F 3/16; G06F 3/165
See application file for complete search history.

(56) References Cited

U.S. PATENT DOCUMENTS

| | | | | |
|---|---|---|---|---|
| 5,736,978 A * | 4/1998 | Hasser | G06F 3/016 434/114 |
| 2014/0322682 A1* | 10/2014 | Baym | G09B 5/02 340/5.6 |

(Continued)

FOREIGN PATENT DOCUMENTS

| | | |
|---|---|---|
| EP | 3291115 A1 | 3/2018 |
| KR | 101956303 B1 | 3/2019 |
| TW | I426473 B | 2/2014 |

OTHER PUBLICATIONS

International Search Report and Written Opinion received for PCT/EP2022/085129, mailed Feb. 28, 2023.

(Continued)

*Primary Examiner* — Timothy A Musselman
(74) *Attorney, Agent, or Firm* — Greer, Burns & Crain, Ltd

(57) ABSTRACT

The invention relates to a system for learning braille, comprising at least one removable element (2) having at least one braille inscription, a main device (1) capable of receiving and identifying the removable element (2), a speaker (S) and an installed unit (5), internal to the main device (1), communicating with a receiver in a housing (7). The system comprises a user identification device (3), independent of said main device (1), which includes a communication module (30) that comprises an identification signal transmitter, a receiver of an update signal for updating user-specific learning level information, and a memory. The installed unit (5) is capable of receiving and processing a user identification signal and is capable of transmitting said (Continued)

update signal in response. A communication module of the identification device communicates with said installed unit using short-range signal-transfer technology.

10 Claims, 3 Drawing Sheets

(56) References Cited

U.S. PATENT DOCUMENTS

2015/0050630 A1* 2/2015 Hanlon .................... G09B 5/02
434/262
2018/0197433 A1* 7/2018 Tavares ................ G09B 21/007

OTHER PUBLICATIONS

French Search Report received for Application No. 2113879, dated Aug. 5, 2022.

* cited by examiner

[Fig. 1]
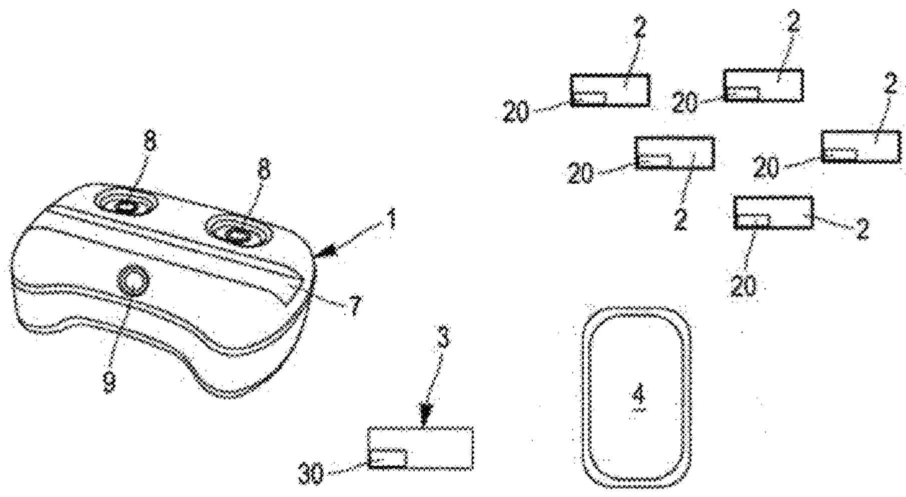
[Fig. 2]
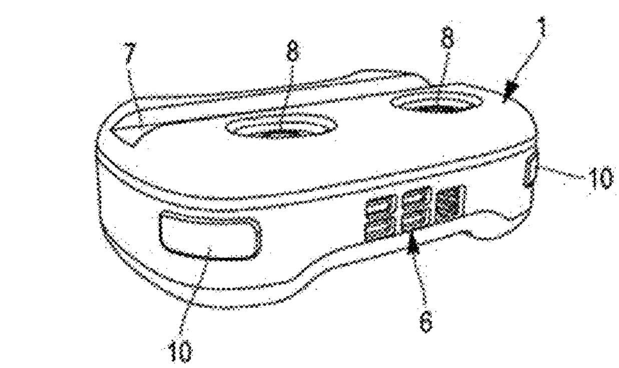
[Fig. 3]
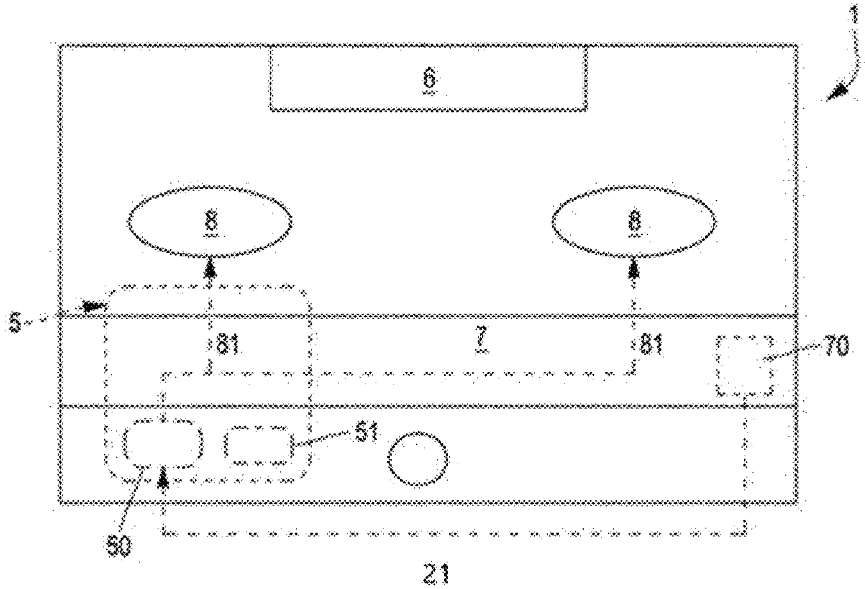

[Fig. 6]
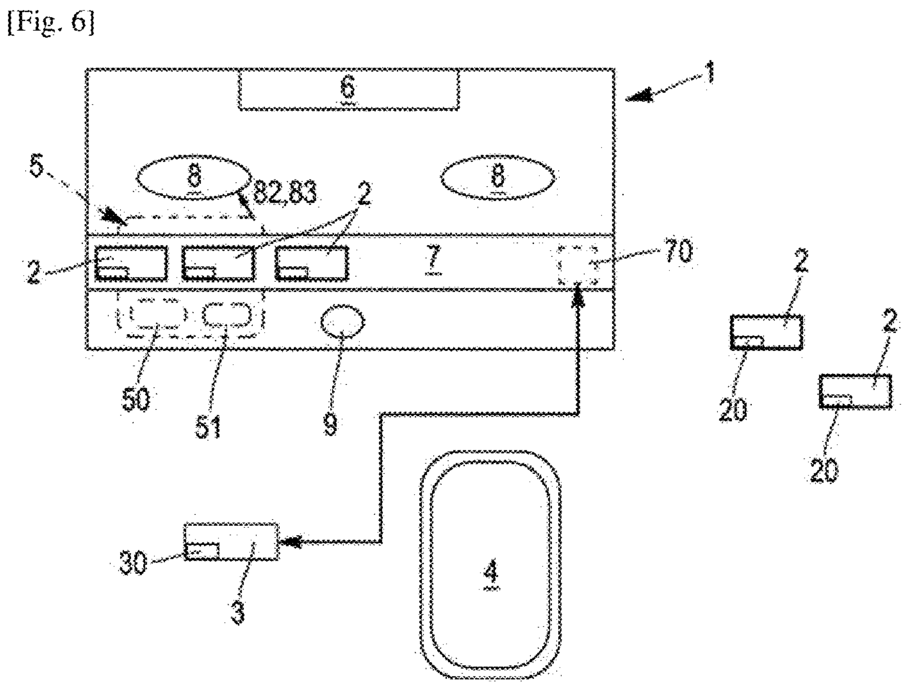

SYSTEM FOR LEARNING BRAILLE AND METHOD FOR IMPLEMENTING SUCH A SYSTEM

BACKGROUND

The invention concerns a system for learning braille by means of different elements communicating with one another and with the user, enabling learning adapted to the user's recorded progress.

Current methods of learning braille are often perceived as archaic: they are still often carried out on books with braille inscriptions and in the presence of accompanying persons.

Learning sessions are often short, because they require a lot of concentration, and they are also sometimes perceived as not being much fun.

The aim of the present invention is therefore to meet two needs: learning braille independently and encouraging users to learn braille by making learning more fun, for example in the form of games.

Today, there are a number of ways to learn braille independently.

For example, patent application TWI426473 provides a system for learning braille via a computer, which uses software for learning and analyses of results and recording of tests, or braille learning exercises, the system being intended for learners and/or teachers.

The system also includes a learning device, associated with the computer, which comprises a rack that can accommodate cubes with braille inscriptions, the rack comprising RFID sensors recognizing the cubes inserted in the racks and comprising RFID tags.

Such a system offers an alternative solution to known braille learning systems, but does not, for example, automatically identify a user and forces the user to go to the computer to access his profile and data: the user cannot go to another computer to resume his program, for example.

Other, simpler systems are also known, such as those described in the KR 101956303 application: the system comprises a box wherein a rail is provided with a loudspeaker, and an identification and communication module. It also includes a set of dominoes, each with a braille inscription. The user is invited to compose words from dominoes, which must be arranged in the box's rail. The module identifies whether or not the compound word is correct, and audible information is transmitted over the loudspeaker to the user, who is thus advised whether or not his answer is correct.

Such a device cannot identify a user and offer him a learning program adapted to his level.

SUMMARY

The invention makes it possible to overcome these disadvantages and to this end proposes a system for learning braille comprising:

- at least one removable element having at least one braille inscription and at least one element signal transmitter, and
- a main device comprising:

at least one housing for receiving said at least one removable element, said housing comprising at least one element signal receiver, a loudspeaker capable of transmitting information audible to a user, in particular a request to test a learning level of said user,

- an installed unit, which communicates with said signal receiver of said housing and with said loudspeaker, said installed unit comprising a module able to receive and process a signal, in particular said element signal, and able to transmit a signal in response to the processed signal, in particular to transmit a response signal controlling the emission of audible information through said loudspeaker.

The system according to the invention is remarkable in that it further comprises a device for identifying a user, said identification device being independent of said main device and enabling a user to be identified by said main device, said identification device comprising a communication module which comprises:

- i) an identification signal transmitter, said identification signal comprising identification information of said user and level information relating to a level of a learning path of the user, and
- ii) a receiver of an update signal from said main device,
- iii) a memory containing said identification information and said level information, said update signal updating the level information. Furthermore, said installed unit of said main device is able to receive and process said identification signal comprising said identification and level information, and able to transmit said update signal in response, said update signal including revised level information if the user has successfully responded to said transmitted request.

In addition, said identification device communication module communicates with said installed unit of said main device via said element signal receiver by short-range signal transfer technology.

Thanks to the presence of the identification device, the system enables the user to follow a learning program on the main device without having to remember his learning level. In addition, he can use a different learning device from one session to the next, as the installed unit, informed by the identification and level information, launches a learning program adapted to the information received.

The system according to the invention may also comprise the following features, taken separately or in combination:

- said short-distance signal transfer technology is advantageously NFC technology, said removable elements each comprising an NFC tag, and said identification device comprising an NFC tag;
- said identification device is preferably a domino, a card or a smartphone;
- said main device preferably comprises at least one manual control button for manually transmitting control signals for an operating mode of said main device to said installed unit;
- the housing of the main device is advantageously a rail, allowing several removable elements to be accommodated;
- said element signal receiver is advantageously positioned at one end of said rail, so that each removable element introduced at a rail end is automatically detected and analyzed;
- the installed unit preferably comprises a memory for storing, in particular, information relating to a scenario of element signals successively received and processed by said installed unit and said signals transmitted in response by said installed unit; and
- said main device preferably comprises connectors for connection to a device connected to the Internet, said device being able to communicate with said main device.

The invention also relates to a method for learning braille, using a system as defined above, which is remarkable in that it comprises the following steps:

identifying said user, said identification comprising the following sub-steps:

i) positioning said identification device above or on said housing, ii) receiving an identification signal by said signal receiver of said housing and transmission of said identification signal to said installed unit of said main device, said identification signal comprising identification information of said user and level information relating to a learning level of said user, iii) processing of said identification signal by said installed unit, said processing including identification of said level information, launching a learning program associated with said level information, identified by said installed unit, issuing a request audible to said user, positioning of a removable element by said user on or above said housing, resulting in reception of an element signal by said receiver in said housing, transmitting said element signal received by said receiver to said installed unit of said main device, processing said element signal received by said processing module of said installed unit, controlling the transmission of a signal audible by said user through said loudspeaker comprising information of the user's success or failure with regard to a result expected in response to said transmitted request, recording said user's success or failure information confronted with the transmitted request, by said installed unit, possible updating of said program level associated with said user by transmitting an update signal from said installed unit module to said communication module of said user identification device.

Advantageously, in the case of application of the method to a system whose installed unit comprises a learning computer program, said method comprises a step according to which the learning computer program is updated when said main device is connected to said apparatus linked to the Internet, said apparatus transmitting to said installed unit instructions to modify said program and said installed unit carrying out said modification instructions received.

BRIEF DESCRIPTION OF THE DRAWINGS

Other benefits and features of the invention will become evident upon examining the detailed description of an entirely non-limiting implementation, and from the enclosed drawings wherein:

FIG. 1 illustrates a system according to the invention in a partially schematic way, the system comprising a main device, a personal identification device and a set of removable elements, the main device being shown in perspective and the other elements being shown schematically, FIG. 2 shows the main device in perspective and from the rear, FIG. 3 is a schematic representation of the main device shown in FIGS. 1 and 2, illustrating some of its internal elements in dotted lines, FIG. 4 shows a first step of a method according to the invention, using the shown system, FIG. 5 shows another step in the method according to the invention, using the shown system, FIG. 6 shows another step in the method according to the invention, using the shown system.

DETAILED DESCRIPTION

[FIG. 1] shows a system according to the invention with its components, some of which are shown schematically.

It can be seen that the system comprises a main device 1, a set of removable elements 2, made, for example, of flat dominoes, each bearing a braille inscription (not shown) and an identification device 3, enabling a user to identify himself on the main device 1.

For the purposes of this example, the user will be referred to as a "learner", the user being a person wishing to learn braille.

The user could also be a player, if the application of the device was not intended for learning braille but for using removable elements bearing braille inscriptions to play by responding to requests sent by the main device.

It must be understood that the system is not limited to learning braille. The system described here uses a smartphone 4. It should be understood, however, that the invention is not limited to the presence of this smartphone: it could implement any other IoT (Internet of Things) device, such as a tablet or computer (portable or not), or even not involve the implementation of an IOP device, without going beyond the scope of the invention.

The smartphone 4, connected to the Internet, is used to update a learning computer program that controls the operation of the main device.

Figures 4, 5:
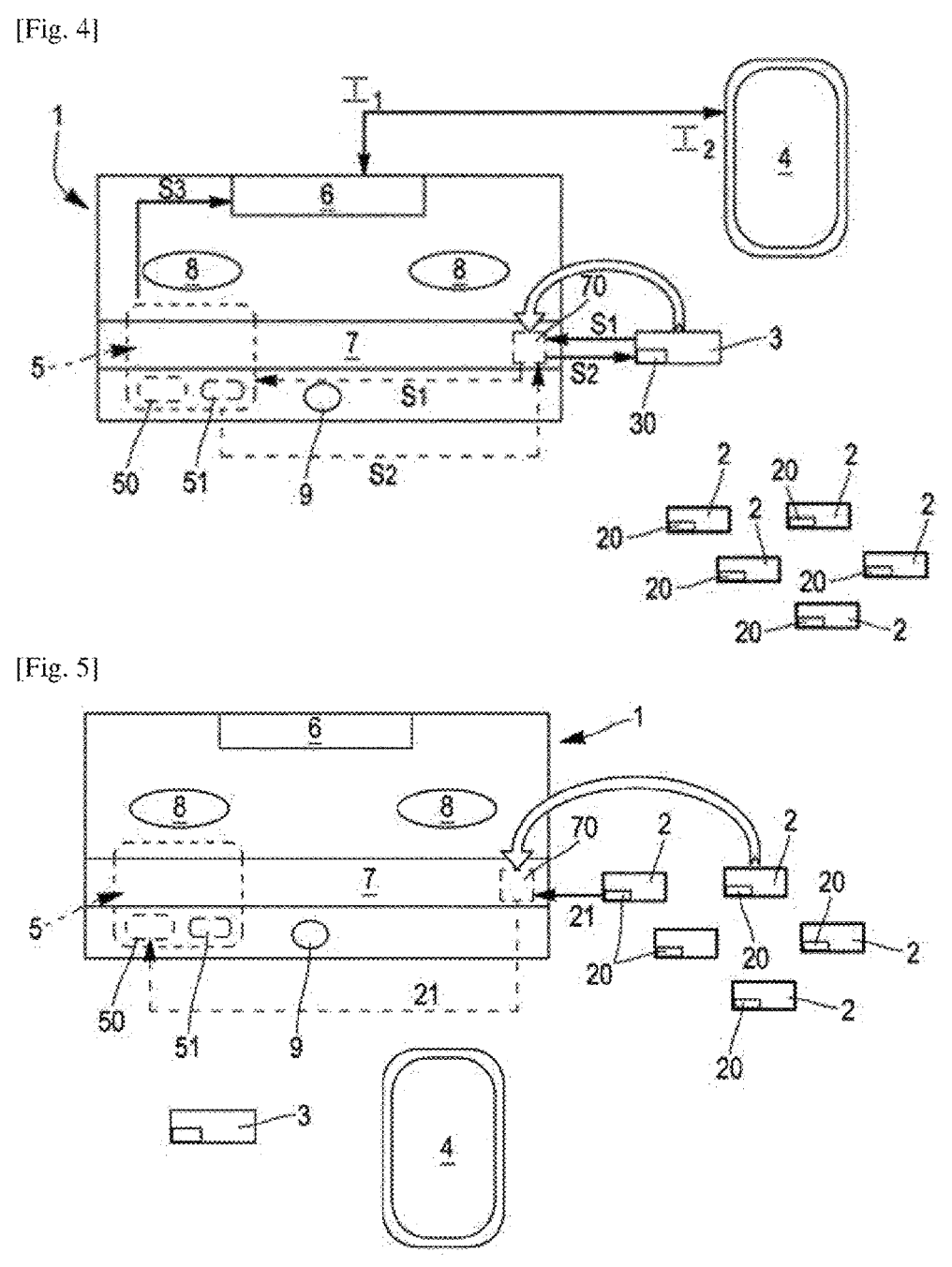

To do this, the main device 1 comprises an installed unit 5 (see FIGS. 3 to 6 for example) wherein the learning program is stored, and updating of this program is carried out by connecting the main device to the smartphone 4, either by wire or by WiFi: the main device 1 is therefore provided with WiFi communication means. It also includes a connector housing 6, which can be seen in particular in [FIG. 2].

The connector box 6 is connected to the installed unit 5 (not shown) and to WiFi communication means, to ensure the transfer of data D with the smartphone 4, the data D being data relating to the updating of the computer program implemented by the device (see for example [FIG. 4]).

To enable a learner to navigate through the menu of a program offered by the main device 1, it is provided to equip the main device 1 with two manual control buttons 10, positioned near the edge of the main device: when actuated, these manual control buttons 10 enable a learner to manually transmit, to said installed unit, control signals for an operating mode of said main device, enabling him to select one program rather than another, for example.

In accordance with the invention, the main device 1 also features at least one housing 7 to accommodate the removable elements 2 (or dominoes 2), two loudspeakers 8 to transmit audible information to the learner.

In this advantageous but non-limiting embodiment, the main device 1 also includes a fingerprint recognition device 9.

The housing 7 is a rail of rectangular cross-section, sized so that it can accommodate several removable dominoes 2, and the removable dominoes 2 can be moved in the rail.

To enable recognition of the dominoes (each with its own braille inscription), the rail 7 (forming the housing) has at least one element signal receiver 70, and each domino 2 has an element signal transmitter 20.

In the example shown, the element signal receiver 70 is positioned at the end of rail 7, which is the end through which a removable domino 2 is inserted into the rail: thus, any domino inserted into rail 7, transmitting a signal, is passed in front of the receiver 70 of the rail 7.

The technology used to transmit and receive signals used by this transmitter and receiver is a short-distance signal transfer technology, in accordance with the invention: in this example, it is an NFC (Near Field Communication) transmitter/receiver (or tag) equipping both the rail 7 (that is, the housing) of the main device 1 and each of the removable dominoes 2 (or removable element).

NFC is a chip-based technology that enables data to be exchanged between a reader and any terminal by means of a simple touch (or contact) between two objects. Communication only works at short distances (substantially less than or equal to approx. 10 cm). The high frequency used is 15.56 MHz, which is also used in smartphones, computers and game consoles for data transfer. The tags are passive, giving them an advantage in terms of autonomy.

NFC technology is chosen specifically for this example because, when the chip is in operation, the NFC transmitter 20 of the dominoes transmits an electric current that connects the device's NFC receiver 70 by magnetic induction. The NFC receiver 70 converts this magnetic field into an electrical pulse, and thus into data bits.

The advantage of NFC technology is that the receiver 70 can also be a transmitter since, when approached by the other NFC tag 20, it can also transmit a magnetic field of its own, transmitting data that can be received by the NFC tag 20, becoming a receiver in this situation.

In addition, the use of this high frequency and magnetic field exchange provides optimized security for data transfer and complies with current protocols such as ISO 14443 and ISO 15693.

The NFC tag 70 (or signal receiver of the housing 7) communicates with the installed unit to communicate data via an element signal 21 which it receives when a removable domino is placed in rail 7. In this way, the installed unit receives information on the domino chosen and placed in the rail by a learner.

The installed unit 5 also communicates with the loudspeakers 8, to transmit an audible message to the learner in response, for example, to receiving data relating to a domino 2 placed in the rail 7. More precisely, as can be seen in [FIG. 3], the installed unit 5 comprises a module 50, able to receive and process a signal, in particular said element signal 21, and able to transmit a response signal 81, in response to the processed signal, in particular to transmit a response signal 81 controlling the emission of audible information through the loudspeakers 8.

In addition, the installed unit 5 also includes a memory 51, for storing information relating to a scenario of element signals 21 received and successively processed by the installed unit's module 50 and said signals 81 sent in response by said installed unit.

Reference will now be made to the identification device 3, in accordance with the invention, enabling the learner to identify himself to the main device 1.

In particular, this identification enables the main device to adapt the level of questions put to the learner, according to the level assigned to the learner.

The identification device 3 is independent of the main device: in fact, it is a device that the learner keeps with him, enabling him to identify him on different main devices: for example, if the learner usually does his exercises on a geographical site that includes a main device, and the learner has to go to another geographical site where there is another main device, this other main device will know how to recognize the learner and the learning level associated with him. This means the learner does not always have to use the same main device.

As with the removable dominoes 2, the identification device 3 comprises a communication module which includes an NFC tag enabling information to be exchanged with the installed unit 5 of the main device 1 via the NFC tag 70 of the housing 7.

The NFC tag 30 of identification device 3 is therefore both a transmitter of identification signal S1, said identification signal S1 comprising learner identification information, relating to the learner's identity and learning level, and a receiver, for example to receive from the main device an update signal S2, comprising the update of the learner's level after completion of an exercise.

The identification device 3 also includes a memory containing this identification and learning level information (for example, this level may be characterized by path information relating to a learner's learning path).

Reference will now be made to a method of implementing the system in accordance with the invention, through an example of the use of the main device 1 and the various other devices/elements included in the system.

FIGS. 4 to 6 illustrate some of the steps of the method:

Before the learner can carry out a step in the learning program, he must identify himself ([FIG. 4]): to do this, he places his domino (or identification device) 3 at the end of the rail 7.

The identification device can be installed in rail 7 or placed above the end of rail 7, that is, above the NFC tag 70. The distance between the identification device 3 and the NFC tag 70 on rail 7 must be no more than 5 cm for the NFC tag 70 (that is, the signal receiver on the housing/rail 7) to detect the presence of the identification device and receive the identification signal S1.

A sound can be issued by the loudspeakers 8 to indicate to the learner that his identification domino has been detected.

Once the NFC tag 70 has picked up the identification signal S1, it transfers it to the installed unit 5 of the main device 1: the installed unit thus identifies both the learner and the learning level assigned to him.

The installed unit 5 then proposes a series of exercises belonging to a specific learning program, tailored to the learner's level: this program proposal is transmitted audibly through the loudspeakers 8 (see arrow S3 in [FIG. 4]).

The learner can navigate through the exercise program using the manual buttons 10 on the main device (see [FIG. 2]).

Once the program or exercise has been chosen (corresponding to the learner's identified level), the main device 1 proposes an exercise to the learner by audibly questioning him through the loudspeakers 8 (in other words, the main device 1 launches a learning program associated with the program level identified for the learner by the installed unit, the launch also including the transmission of a first piece of information—or request—audible through said loudspeaker).

The request may consist of asking the learner to produce a particular sentence in braille, using the removable dominoes 2 available near the device 1.

The learner then chooses removable dominoes 2 and places them one by one in rail 7, from right to left (see [FIG. 5]).

Each time a domino is placed in rail 7 from right to left, an element signal 21 is picked up by rail 7's NFC tag 70, which transmits it to installed unit 5: in this way, the domino chosen by the learner and placed in rail 7 is identified by the installed unit 5 of the main device 1.

The reception and processing module 50 of the installed unit 5 identifies the selected removable domino 2 using information contained in the element signal 21 received. It compares this information with the information expected for the exercise, and records in memory 51 the result of this comparison: correct or incorrect.

[FIG. 6] shows that the learner placed three removable dominoes 2 in the rail 7, and each of the dominoes 2 transmitted information specific to each domino 2 to the installed unit 5. This information has been processed by module 50 and the result of the comparison with the expected result has been stored in memory 51.

If the set of results stored in the memory is consistent with the expected result, then the installed unit 5 controls the emission of a signal 82 audible by said learner through the loudspeakers 8, the signal indicating to the learner that he has passed the exercise.

If, on the other hand, the results stored in memory 51 contain errors, then the installed unit 5 orders the issuance of a signal 83 audible to the learner through the loudspeakers 8, the signal indicating to the learner that he has failed the exercise.

The signal transmitted by the installed unit thus includes information about success 82 or failure 83 with regard to an expected result following the sent request.

The success or failure information is also recorded by the installed unit 5, in memory 51, and is associated with the learner's identifier.

At the end of the learning session, the learner passes his identification domino 3 back in front of the NFC tag 70 of the housing/rail 7, and the information relating to the learner's level is updated if the learner has succeeded in answering the request correctly: to do this, an update signal S2 is transmitted by said installed unit module 50 to said NFC tag 70, and the information is transmitted from said NFC tag 70 to said communication module 30 (NFC tag 30) of said learner's identification device 3 (the removable domino).

Thus, in the next session, when the learner identifies himself again, his identifier will be associated with a learning level that has taken into account the results of the previous session.

At the same time, it should be noted that the installed unit 5 of said main device 1 includes at least one learning computer program, which in particular generates the requests generated by the installed unit 5 and sent by the main device 1. This learning program is updated when said main device 1 is connected to an IoT-type device linked to the Internet.

This update can be carried out either by wire, by physically connecting the main device 1 to the IoT device (computer, cell phone, tablet, etc.) by means of the connector box 6, or via a WiFi system, for example using the learner's cell phone (smartphone) 4.

For this purpose, the main device 1 is equipped with the WiFi data transmission system (not shown).

Thus, the cell phone can transmit, via the WiFi system or via the connectors on box 6, instructions 11 for modifying said program to said installed unit 5 of device 1, and said installed unit 5 carries out said received modification instructions.

Also, the main device 1 can communicate, via the WiFi system or via the wired transmission system enabled by the connectors on box 6, information 12 about the learner and his results to a dedicated application on smartphone 4.

It is clear from the above description how the invention makes it possible to adapt a learning program to a learner by enabling the learner to be identified by the device and by proposing a program adapted to the learner which depends on his level and the recorded successes or failures which are specific to the learner.

It should be understood that the system in accordance with the invention could include variants: dominoes could be replaced by cards or any other medium for braille inscriptions, and the identification device could be different from a domino. The identification device could be a card or the learner's smartphone equipped with a communication module specific to the invention.

The invention claimed is:

1. A system for learning braille comprising:

at least one removable element having at least one braille inscription and at least one element signal transmitter; and a main device comprising:

at least one housing for receiving said at least one removable element, said housing comprising at least one element signal receiver;

at least one loudspeaker capable of transmitting information audible to a user, in particular a request to test a learning level of said user;

an installed unit, which communicates with said signal receiver of said housing and with said loudspeaker, said installed unit comprising a module capable of receiving and processing a signal, in particular said element signal, and able to transmit a response signal controlling the transmission of audible information through said loudspeaker;

said system further comprising:

a user identification device, said identification device being independent of said main device and enabling a user to be identified by said main device, said identification device comprising a communication module which comprises:

i) a transmitter of identification signal, said identification signal comprising identification information of said user and information about the level relating to a level of a learning path of the user; and ii) a receiver of an update signal from said main device;

iii) a memory containing said identification information and said level information, said update signal updating the level information;

said installed unit of said main device is capable of receiving and processing said identification signal comprising said identification and level information, and capable of transmitting said update signal in response, said update signal comprising revised level information if the user has successfully responded to said sent request; and said communication module of the identification device communicates with said installed unit of said main device via said element signal receiver by short-range signal transfer technology.

2. The system according to claim 1, characterized in that said short-range signal transfer technology is NFC technology, in that said at least one removable element comprises an NFC tag, in that said identification device comprises an NFC tag.

3. The system according to claim 1, characterized in that said identification device is a domino, a card or a smartphone.

4. The system according to claim 1, characterized in that said main device comprises at least one manual control button for manually transmitting, to said installed unit, control signals for an operating mode of said main device.

5. The system according to claim 1, characterized in that the housing of the main device is a rail.

6. The system according to claim 5, characterized in that said element signal receiver is positioned at one end of said rail.

7. The system according to claim 1, characterized in that said installed unit also comprises a memory for storing, in particular, information relating to a scenario of element signals received and processed successively by said installed unit and said signals transmitted in response by said installed unit.

8. The system according to claim 1, characterized in that said main device comprises connectors for connection to a device connected to the Internet, said device being able to communicate with said main device.

9. A method for learning braille, implementing a system according to claim 1, characterized in that it comprises the following steps:

identifying said user, said identification comprising the following sub-steps:

i) positioning said identification device above or on said housing;

ii) receiving an identification signal by said signal receiver of said housing and transmitting said identification signal to said installed unit of said main device, said identification signal comprising identification information of said user and level information relating to a learning level of said user;

iii) processing of said identification signal by said installed unit, said processing comprising the identification of said level information;

launching a learning program associated with said level of information, identified by said installed unit;

issuing a request audible to said user;

positioning of a removable element by said user on or above said housing, resulting in the reception of an element signal by said element signal receiver in said housing;

transmitting said element signal received by said element signal receiver to said installed unit of said main device;

processing said element signal received by said processing module of said installed unit;

controlling the transmission of an audible signal by said user through said loudspeaker comprising information of the user's success or failure with regard to an expected result in response to said transmitted request;

recording of the success or failure of said user's response to the request issued by said installed unit; and possible updating of said program level associated with said user by transmitting an update signal to said communication module of said user identification device.

10. The method for learning according to claim 9, implementing a system characterized in that said main device comprises connectors for connection to a device connected to the Internet, said device being able to communicate with said main device, wherein the installed unit of said main device comprises a learning computer program, said method including a step according to which the learning computer program is updated when said main device is connected to said apparatus linked to the Internet, said apparatus transmitting to said installed unit instructions to modify said program and said installed unit carrying out said modification instructions received.

* * * * *